(12) United States Patent
Pesola et al.

(10) Patent No.: US 8,590,425 B2
(45) Date of Patent: Nov. 26, 2013

(54) HYBRID PROPULSION SYSTEM FOR A MOTOR VEHICLE

(75) Inventors: Fabio Pesola, Orbassano (IT); Gianluigi Pregnolato, Orbassano (IT); Andrea Piazza, Orbassano (IT); Marco Garabello, Orbassano (IT); Valter Pastorello, Orbassano (IT)

(73) Assignee: C.R.F. Societa' Consortile per Azioni, Orbassano, Turin (IT)

( * ) Notice: Subject to any disclaimer, the term of this patent is extended or adjusted under 35 U.S.C. 154(b) by 327 days.

(21) Appl. No.: 12/944,620

(22) Filed: Nov. 11, 2010

(65) Prior Publication Data

US 2011/0113923 A1    May 19, 2011

(30) Foreign Application Priority Data

Nov. 13, 2009 (EP) .................................... 09425462

(51) Int. Cl.
*F16H 37/06* (2006.01)

(52) U.S. Cl.
USPC .............................. 74/665 D; 74/330; 74/331

(58) Field of Classification Search
USPC .......................................... 74/330, 331, 665
See application file for complete search history.

(56) References Cited

U.S. PATENT DOCUMENTS

| | | | |
|---|---|---|---|
| 4,598,223 A | 7/1986 | Glennon et al. | |
| 6,071,208 A * | 6/2000 | Koivunen | 475/275 |
| 6,561,336 B1 * | 5/2003 | Huart et al. | 192/70.252 |
| 6,634,247 B2 * | 10/2003 | Pels et al. | 74/329 |
| 6,740,002 B1 * | 5/2004 | Stridsberg | 477/14 |
| 6,848,548 B2 * | 2/2005 | Alfredsson | 192/3.25 |
| 2003/0075408 A1 * | 4/2003 | Alfredsson | 192/3.25 |
| 2003/0217617 A1 | 11/2003 | Sakamoto et al. | |
| 2004/0149080 A1 | 8/2004 | Pollak | |
| 2005/0139035 A1 | 6/2005 | Lee et al. | |
| 2009/0127946 A1 | 5/2009 | Fee et al. | |
| 2011/0113923 A1 * | 5/2011 | Pesola et al. | 74/665 D |

FOREIGN PATENT DOCUMENTS

| | | |
|---|---|---|
| DE | 103 05 639 A1 | 3/2004 |
| DE | 103 60 075 A1 | 7/2004 |
| DE | 10 2004 013 721 A1 | 10/2005 |
| JP | 2003-237393 A | 8/2003 |
| JP | 2007-143247 A | 6/2007 |
| WO | WO 2005/091468 A1 | 9/2005 |

* cited by examiner

*Primary Examiner* — Troy Chambers
*Assistant Examiner* — Alexander Vu
(74) *Attorney, Agent, or Firm* — Merchant & Gould P.C.

(57) ABSTRACT

The propulsion system includes an internal combustion engine, an electric machine and a double-clutch transmission with a clutch unit and a mechanical gearbox. The gearbox has two coaxial primary shafts intended to be torsionally connected each to a shaft of the internal combustion engine of the motor vehicle by a respective friction clutch of the clutch unit, as well as a secondary shaft and a lay shaft arranged parallel to the two primary shafts. The electric machine is permanently kinematically connected to either of the two primary shafts via a first gear train including a pinion mounted on an output shaft of the electric machine, an intermediate gearwheel mounted on an intermediate shaft and a gearwheel mounted on the primary shaft and acting as driving gearwheel of a second gear train of the gearbox associated to one of the gears, in particular to the second forward gear. The gearbox further includes a casing and the electric machine is inserted and fixed into a seat formed by that casing. An outer surface of a stator of the electric machine forms a spiral-shaped profile which serves as cooling circuit for the electric machine and is closed on the radially outer side by an inner cylindrical surface of the seat, in such a manner that the channels of the cooling circuit are defined between the spiral-shaped profile and the inner cylindrical surface.

5 Claims, 5 Drawing Sheets

US 8,590,425 B2

HYBRID PROPULSION SYSTEM FOR A MOTOR VEHICLE

This application claims benefit of Serial No. 09425462.0, filed 13 Nov. 2009 in the European Patent Office and which application is incorporated herein by reference. To the extent appropriate, a claim of priority is made to each of the above disclosed applications.

BACKGROUND OF THE INVENTION

The present invention refers in general to a hybrid propulsion system for a motor vehicle comprising an internal combustion engine, an electric machine and a double-clutch transmission provided with a mechanical gearbox. More particularly, the invention relates to the subsystem formed by the electric machine and the gearbox of the double-clutch transmission of the hybrid propulsion system defined above.

US2005/139035 discloses a hybrid propulsion system for a motor vehicle comprising an internal combustion engine, an electric machine and a double-clutch transmission, wherein the double-clutch transmission comprises a clutch unit and a mechanical gearbox having a pair of coaxial primary shafts intended to be torsionally coupled each with a drive shaft of the internal combustion engine of the motor vehicle by means of a respective friction clutch of the clutch unit, as well as a secondary shaft and a lay shaft both arranged parallel to the two primary shafts, and wherein the electric machine is permanently cinematically connected to either of the two primary shafts of the gearbox via a gear train including a pinion mounted on an output shaft of the electric machine, at least one intermediate gearwheel and a gearwheel which is mounted on the aforesaid primary shaft of the gearbox and acts as driving gearwheel of a gear train associated to one of the gears of the gearbox.

SUMMARY OF THE INVENTION

It is an object of the present invention to provide an easy and inexpensive way of mounting the electric machine in the casing of the gearbox.

This and other objects are fully achieved according to the present invention by virtue of a hybrid propulsion system for a motor vehicle comprising an internal combustion engine, an electric machine and a double-clutch transmission, wherein the double-clutch transmission comprises a clutch unit and a mechanical gearbox, wherein the gearbox comprises two coaxial primary shafts intended to be torsionally connected each to a shaft of the internal combustion engine of the motor vehicle by means of a respective friction clutch of the clutch unit, as well as a secondary shaft and a lay shaft arranged parallel to the two primary shafts, wherein the electric machine is permanently cinematically connected to either of the two primary shafts via a first gear train including a pinion mounted on an output shaft of the electric machine, by at least one intermediate gearwheel and by a gearwheel mounted on said primary shaft and acting as driving gearwheel of a second gear train of the gearbox associated to one of the forward gears, wherein the gearbox comprises a casing forming a seat which has an inner cylindrical surface and in which the electric machine is accommodated and fixed, and wherein an outer surface of a stator of the electric machine forms a spiral-shaped profile which serves as cooling circuit for the electric machine and is closed on the radially outer side by the inner cylindrical surface of the seat, in such a manner that the channels of the cooling circuit are defined between said spiral-shaped profile and said inner cylindrical surface.

BRIEF DESCRIPTION OF THE DRAWINGS

The characteristics and the advantages of the invention will become clear from the detailed description given hereinafter purely by way of non-limiting example with reference to the appended drawings, in which.

DETAILED DESCRIPTION OF THE PREFERRED EMBODIMENTS

Figure 1:
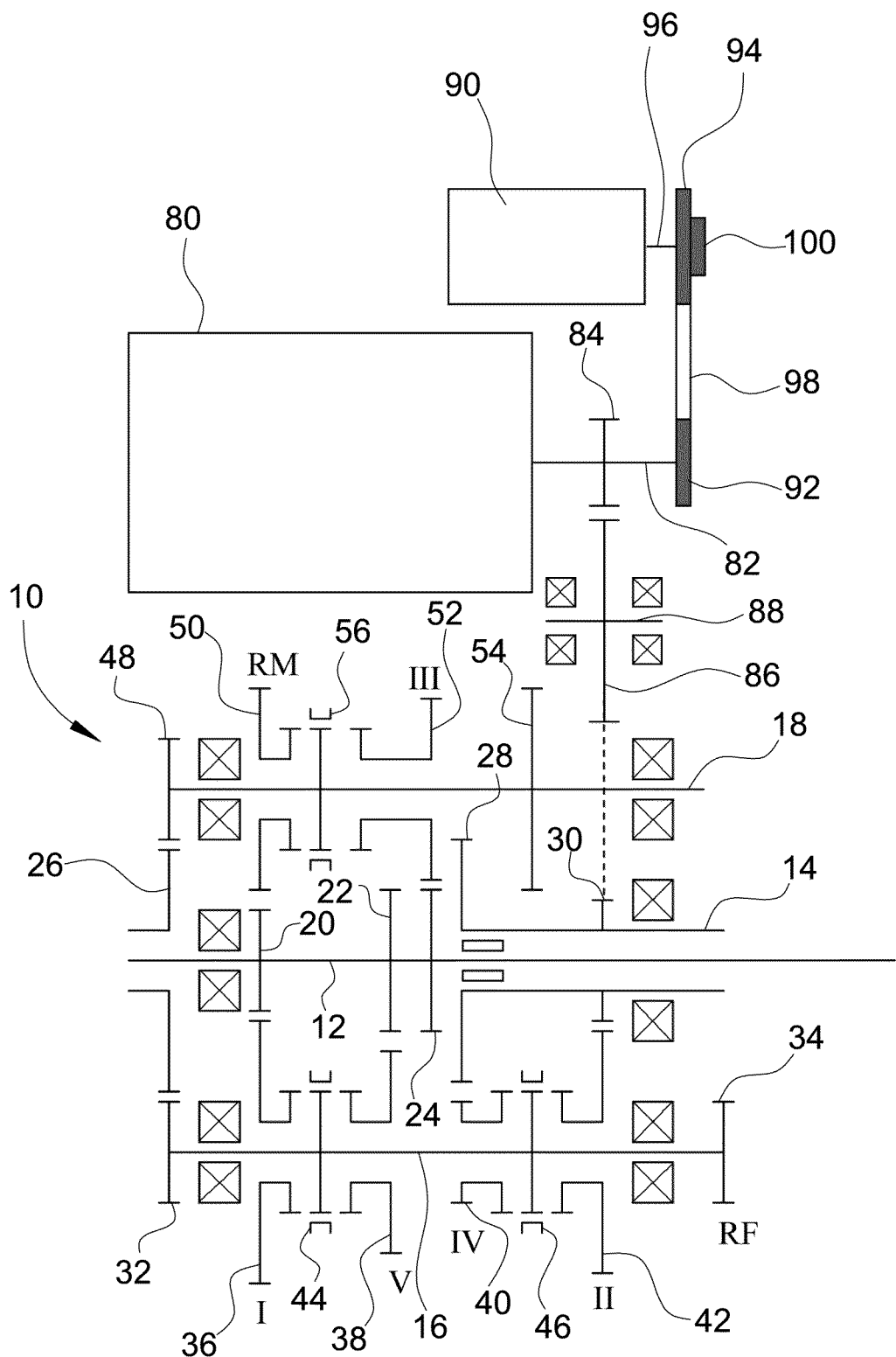
FIG. 1 is a schematic illustration of the subsystem of a hybrid propulsion system according to the present invention formed by an electric machine and by a mechanical gearbox with five forward gears and one reverse gear.

With reference first to FIG. 1, a mechanical gearbox and an electric machine forming part of a hybrid propulsion system for a motor vehicle also comprising an internal combustion engine (not shown) and a clutch unit (also not shown) forming with the gearbox 10 a double-clutch transmission are indicated 10 and 80, respectively. In the embodiment illustrated in FIG. 1, the gearbox 10 is a gearbox with five forward gears and one reverse gear and comprises:

- a first primary shaft 12 torsionally connected to a crankshaft of the internal combustion engine by means of a respective first friction clutch of the clutch unit of the double-clutch transmission;
- a second primary shaft 14 torsionally connected to the crankshaft of the internal combustion engine of the motor vehicle by means of a respective second friction clutch of the clutch unit of the double-clutch transmission, the second primary shaft 14 being arranged coaxially with the first primary shaft 12, and in particular, according to the illustrated example, outside the first primary shaft 12; and
- a secondary shaft 16 and a lay shaft 18 both arranged parallel to the two primary shafts 12 and 14.

The first primary shaft 12 (inner primary shaft) projects axially from the second primary shaft 14 (outer primary shaft) and carries, in order from the side axially opposite to the clutch unit of the transmission (left-hand side, relative to the observer of FIG. 1) to the side axially facing the clutch unit of the transmission (right-hand side, relative to the observer of FIG. 1), a gearwheel 20 acting as driving gearwheel for both the gear train of first gear and the gear train of reverse gear, a gearwheel 22 acting as driving gearwheel for the gear train of fifth gear and a gearwheel 24 acting as driving gearwheel for the gear train of third gear. The first primary shaft 12 also carries, at the left-hand end relative to the observer of FIG. 1, an idle gearwheel 26 acting as intermediate gearwheel of a gear train which cinematically connects the lay shaft 18 with the secondary shaft 16, as will be further explained in the following part of the description. The second primary shaft 14 carries, in order from left to right relative to the observer of FIG. 1, a gearwheel 28 acting as driving gearwheel for the gear train of fourth gear and a gearwheel 30 acting as driving gearwheel for the gear train of second gear. The driving gearwheels 20, 22, 24, 28 and 30 mentioned above are made as fixed gearwheels, i.e. as gearwheels permanently fast for rotation with the respective shafts.

The secondary shaft 16 carries, at the end axially opposite to the clutch unit, a gearwheel 32 which is made as a fixed gearwheel and permanently meshes with the idle gearwheel 26 of the first primary shaft 12 and, at the end axially facing the clutch unit, a final reduction pinion 34 intended to mesh permanently with an input gearwheel or ring gear of a differential gear of the motor vehicle (not shown). The secondary shaft 16 also carries, in order from left to right relative to the observer of FIG. 1, between the gearwheel 32 and the final reduction pinion 34, a gearwheel 36 permanently meshing with the driving gearwheel 20 and acting as driven gearwheel of the gear train of first gear, a gearwheel 38 permanently meshing with the driving gearwheel 22 and acting as driven gearwheel of the gear train of fifth gear, a gearwheel 40 permanently meshing with the driving gearwheel 28 and acting as driven gearwheel of the gear train of fourth gear, and a gearwheel 42 permanently meshing with the driving gearwheel 30 and acting as driven gearwheel of the gear train of second gear. The driven gearwheels 36, 38, 40 and 42 mentioned above are made as idle gearwheels and are selectively connectable for rotation with the secondary shaft 16 by means of a pair of sliding engagement sleeves 44 and 46. More precisely, the sliding engagement sleeve 44 is interposed between the gearwheels 36 and 38 and is selectively movable to the left or to the right to connect the gearwheel 36 or the gearwheel 38, respectively, for rotation with the secondary shaft 16, thereby engaging the first gear or the fifth gear, respectively, whereas the sliding engagement sleeve 46 is interposed between the gearwheels 40 and 42 and is selectively movable to the left or to the right to connect the gearwheel 40 or the gearwheel 42, respectively, for rotation with the secondary shaft 16, thereby engaging the fourth gear or the second gear, respectively.

The lay shaft 18 carries, at the end axially opposite to the clutch unit, a gearwheel 48 which is made as fixed gearwheel and permanently meshes with the idle gearwheel 26 of the first primary shaft 12, in such a manner that the lay shaft 18 is permanently cinematically connected with the secondary shaft 16 by means of the gear train formed by the gearwheel 48 which is fast for rotation with the lay shaft 18, by the idle gearwheel 26 which is coaxial to the first primary shaft 12 and by the gearwheel 32 which is fast for rotation with the secondary shaft 16. The lay shaft 18 also carries, in order from left to right relative to the observer of FIG. 1, a gearwheel 50 permanently meshing with the gearwheel 36 mounted on the secondary shaft 16 and acting as intermediate gearwheel of the gear train of reverse gear, a gearwheel 52 permanently meshing with the driving gearwheel 24 mounted on the first primary shaft 12 and acting as intermediate gearwheel of the gear train of third gear and a gearwheel 54 acting as parking gearwheel. The intermediate gearwheels 50 and 52 mentioned above are made as idle gearwheels, whereas the parking gearwheel 54 is made as fixed gearwheel. A sliding engagement sleeve 56 is interposed between the gearwheels 50 and 52 and is selectively movable to the left or to the right to connect the gearwheel 50 or the gearwheel 52, respectively, for rotation with the lay shaft 18, thereby implementing the engagement of the reverse gear or of the third gear, respectively.

Therefore, the transmission of the torque with the reverse gear and at least one of the forward gears (in the present case the third gear) engaged takes place via the lay shaft 18. More specifically, with the reverse gear engaged (sliding engagement sleeve 56 in the left-hand shift position), the torque is transmitted from the first primary shaft 12 to the lay shaft 18 via the gear train formed by the gearwheel 20 mounted on the primary shaft 12 and acting as driving gearwheel, by the gearwheel 36 mounted on the secondary shaft 16 and acting as idle gearwheel, and by the gearwheel 50 mounted on the lay shaft 18 and acting as driven gearwheel, and then from the lay shaft 18 to the secondary shaft 16 via the gear train formed by the gearwheel 48 mounted on the lay shaft 18 and acting as driving gearwheel, by the gearwheel 26 mounted on the first primary shaft 12 and acting as idle gearwheel, and by the gearwheel 32 mounted on the secondary shaft 16 and acting as driven gearwheel. With the third gear engaged (sliding engagement sleeve 56 in the right-hand shift position), the torque is transmitted from the first primary shaft 12 to the lay shaft 18 via the gear train formed by the gearwheel 24 mounted on the primary shaft 12 and acting as driving gearwheel, and by the gearwheel 52 mounted on the lay shaft 18 and acting as driven gearwheel, and then from the lay shaft 18 to the secondary shaft 16 via the above-described gear train formed by the gearwheels 48, 26 and 32.

The gearbox described above with reference to FIG. 1 enables to carry out all the single gear shifts in so-called powershift mode, i.e. with simultaneous engagement of the old and new gears, apart from the gear shift from the first gear to the reverse gear and vice versa, since all the driving gearwheels associated to the odd gears (first, third and fifth gears) are mounted on the one primary shaft (in the present case the first primary shaft 12), whereas all the driving gearwheels associated to the even gears (second and fourth gears) are mounted on the other primary shaft (in the present case the second primary shaft 14). Moreover, the use of a lay shaft carrying the intermediate gearwheels of the gear trains implementing the reverse gear and one of the forward gears (in the present case the third gear) makes it possible to limit the axial sizes of the gearbox with respect to a gearbox architecture having only one secondary shaft and no lay shaft. Moreover, the mounting of the parking gearwheel on the lay shaft makes it possible to reduce the actuation forces of the parking device.

According to the present invention, the electric machine 80 is arranged parallel to the gearbox, i.e. with the axis of an output shaft 82 thereof arranged parallel to the axes of the shafts 12, 14, 16 and 18 of the gearbox, and is permanently cinematically connected to one of the primary shafts 12, 14 (in the proposed example to the second primary shaft 14 associated to the even gears) of the gearbox 10 via a gear train consisting of a pinion 84 mounted on the output shaft 82 of the electric machine 80, of an intermediate gearwheel 86 mounted on a special intermediate shaft 88 (supported by the case of the gearbox 10) and permanently meshing with the pinion 84, and of one of the gearwheels mounted on the aforesaid primary shaft 12, 14 of the gearbox (in the example of FIG. 1 of the gearwheel 30 acting as driving gearwheel for the gear train of second gear). By virtue of the direct connection with either of the two primary shafts of the gearbox, the electric machine 80 is able to perform, in addition to the usual functions of traction (generation of mechanical power for the wheels of the vehicle taking energy from the high-voltage batteries of the vehicle) and of generation (generation of electrical power for the high-voltage batteries of the vehicle taking energy from the recovery of the kinetic energy of the vehicle or from the operation of the internal combustion engine when the vehicle is still), also the functions of alternator and of starting motor, and hence to make it possible to avoid the use of additional alternator and starting motor.

Advantageously, the electric machine 80 is also connected to a compressor 90 of the air conditioner by means of a driving pulley 92 mounted on the output shaft 82 of the electric machine 80, a driven pulley 94 mounted on a drive shaft 96 of the compressor 90, a belt 98 wound on the two pulleys 92 and 94, and an electromagnetic clutch 100 associated to the driven pulley 94. The electric machine 80 is thus able to perform the additional function of generating mechanical power for the compressor 90 of the air conditioner, which is particularly useful as it allows the compressor of the air conditioner to operate also when the internal combustion engine is not running. The electric machine 80 and the compressor 90 of the air conditioner (in case of the compressor being connected to the electric machine) can thus be shifted from the side of the internal combustion engine to the side of the gearbox of the motor vehicle.

Figure 2:
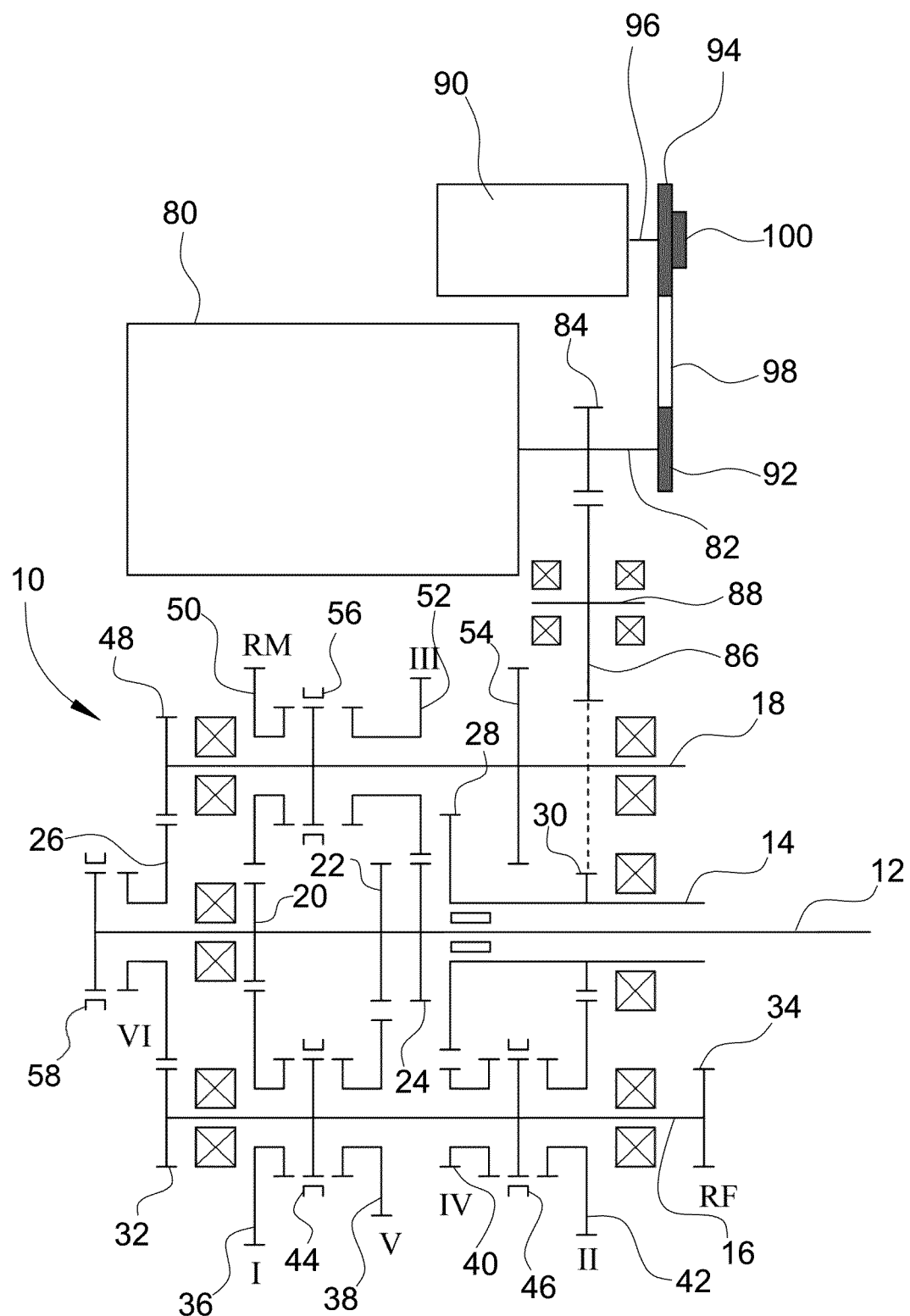
FIG. 2 is a schematic illustration of the subsystem of a hybrid propulsion system according to the present invention formed by an electric machine and by a mechanical gearbox with six forward gears and one reverse gear.

A further embodiment of the invention is illustrated in FIG. 2, where parts and elements identical or similar to those of FIG. 1 have been given the same reference numerals.

The gearbox shown in FIG. 2 is a gearbox with six forward gears and one reverse gear which also comprises a pair of primary shafts 12 and 14, a secondary shaft 16 and a lay shaft 18. The arrangement of the gearwheels associated to the first five forward gears and to the reverse gear is identical to that of the gearbox of FIG. 1, and therefore reference is made to the above detailed description of that gearbox. The sixth gear is obtained by adding a sliding engagement sleeve 58 associated to the gearwheel 26 to connect it for rotation with the first primary shaft 12. In this way, when the sliding engagement sleeve 58 is operated to connect the gearwheel 26 for rotation with the first primary shaft 12, the torque is transmitted directly by the first primary shaft 12 to the secondary shaft 16 via the gear train formed by the gearwheel 26 acting as driving gearwheel and by the gearwheel 32 acting as driven gearwheel.

The gearbox according to FIG. 2 offers the same advantages mentioned above with reference to the gearbox of FIG. 1, with the difference that in the present case the gear shift from the fifth gear to the sixth gear, and vice versa, in powershift mode is not allowed, but the gear shift from the sixth gear to the fourth or second gear (the so-called kick-down) in powershift mode is allowed.

As far as the electric machine 80 is concerned, the previous description relating to FIG. 1 fully applies.

Figure 3:
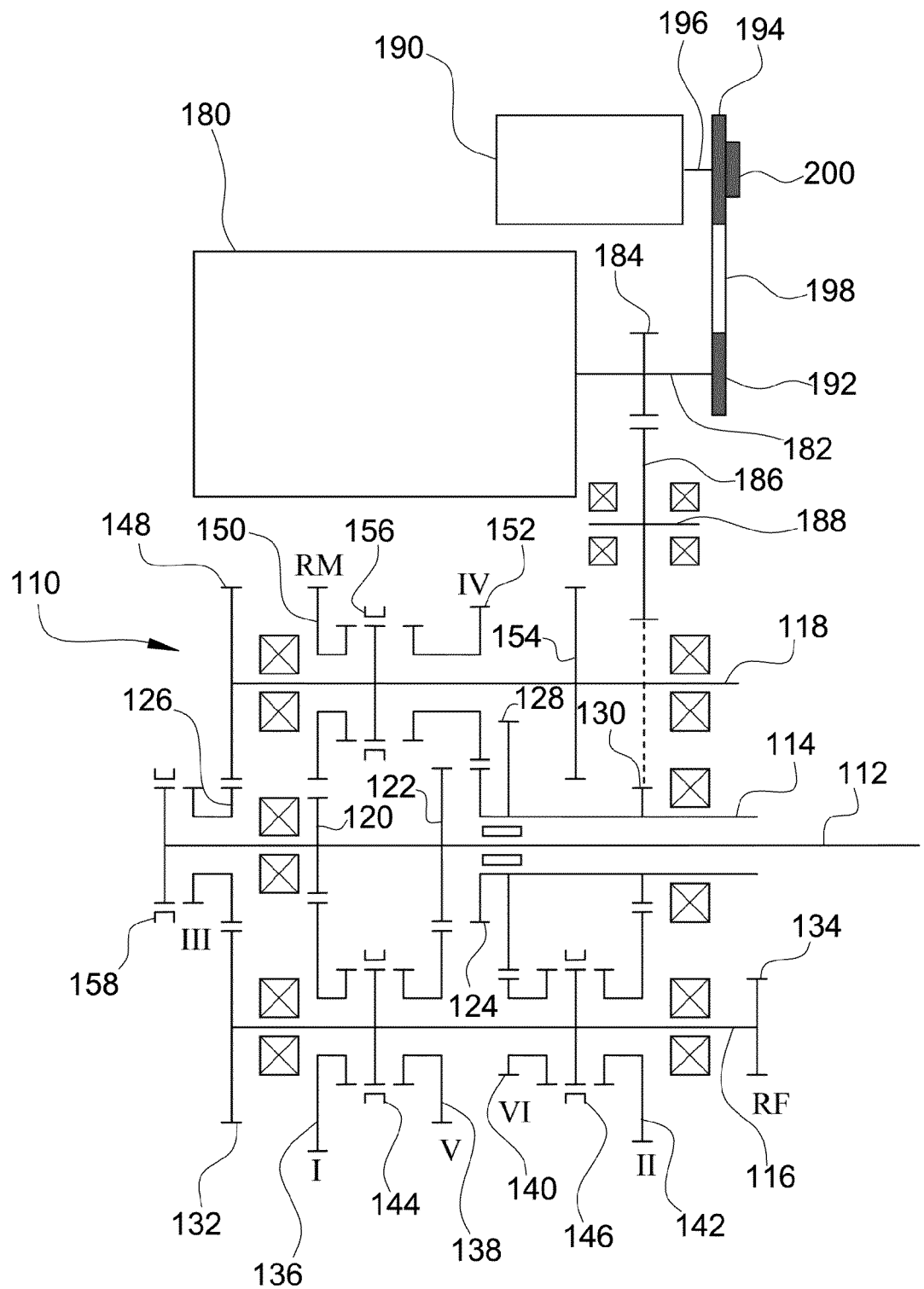
FIG. 3 is a schematic illustration of the subsystem of a hybrid propulsion system according to the present invention formed by an electric machine and by a mechanical gearbox with six forward gears and one reverse gear, wherein the gearbox differs from that of FIG. 2 in the arrangement of the gearwheels forming the gear trains associated to the various gears.

A further embodiment of the invention is illustrated in FIG. 3, where parts and elements identical or similar to those of FIG. 2 have been given the same reference numerals, increased by 100.

With reference to FIG. 3, the gearbox is generally indicated 110 and also comprises a first primary shaft 112 (inner primary shaft), a second primary shaft 114 (outer primary shaft), a secondary shaft 116 and a lay shaft 118.

The first primary shaft 112 projects axially from the second primary shaft 114 and carries, in order from left to right relative to the observer of FIG. 3, an idle gearwheel 126 acting both as intermediate gearwheel of a gear train which cinematically connects the lay shaft 118 to the secondary shaft 116, and as driving gearwheel for the gear train of third gear, a gearwheel 120 acting as driving gearwheel both for the gear train of first gear and for the gear train of reverse gear, and a gearwheel 122 acting as driving gearwheel for the gear train of fifth gear. The second primary shaft 114 carries, in order from left to right relative to the observer of FIG. 3, a gearwheel 124 acting as driving gearwheel for the gear train of fourth gear, a gearwheel 128 acting as driving gearwheel for the gear train of sixth gear and a gearwheel 130 acting as driving gearwheel for the gear train of second gear. The above-mentioned driving gearwheels 120, 122, 124, 128 and 130 are made as fixed gearwheels, i.e. they are permanently fast for rotation with the respective shafts.

The secondary shaft 116 carries, at the end axially opposite to the clutch unit, a gearwheel 132 which is made as fixed gearwheel and permanently meshes with the idle gearwheel 126 of the first primary shaft 112 and, at the end axially facing the clutch unit, a final reduction pinion 134 intended to mesh permanently with an input gearwheel or ring gear of the differential gear of the motor vehicle (not shown). The secondary shaft 116 also carries between the gearwheel 132 and the final reduction pinion 134, in order from left to right relative to the observer of FIG. 3, a gearwheel 136 permanently meshing with the driving gearwheel 120 and acting as driven gearwheel of the gear train of first gear, a gearwheel 138 permanently meshing with the driving gearwheel 122 and acting as driven gearwheel of the gear train of fifth gear, a gearwheel 140 permanently meshing with the driving gearwheel 128 and acting as driven gearwheel of the gear train of sixth gear, and a gearwheel 142 permanently meshing with the driving gearwheel 130 and acting as driven gearwheel of the gear train of second gear. The above-mentioned driven gearwheels 136, 138, 140 and 142 are made as idle gearwheels and are selectively connectable for rotation with the secondary shaft 116 by means of a pair of sliding engagement sleeves 144 and 146. More specifically, the sliding engagement sleeve 144 is interposed between the gearwheels 136 and 138 and is selectively movable to the left or to the right to connect the gearwheel 136 or the gearwheel 138, respectively, for rotation with the secondary shaft 116, thereby engaging the first gear or the fifth gear, respectively, whereas the sliding engagement sleeve 146 is interposed between the gearwheels 140 and 142 and is selectively movable to the left or to the right to connect the gearwheel 140 or the gearwheel 142, respectively, for rotation with the secondary shaft 116, thereby engaging the sixth gear or the second gear, respectively.

The lay shaft 118 carries, at the end axially opposite to the clutch unit, a gearwheel 148 which is made as fixed gearwheel and permanently meshes with the idle gearwheel 126 of the first primary shaft 112, in such a manner that the lay shaft 118 is permanently cinematically connected with the secondary shaft 116 by means of the gear train formed by the gearwheel 148 which is fast for rotation with the lay shaft 118, by the idle gearwheel 126 which is coaxial to the first primary shaft 112 and by the gearwheel 132 which is fast for rotation with the secondary shaft 116. The lay shaft 118 also carries, in order from left to right relative to the observer of FIG. 3, a gearwheel 150 permanently meshing with the gearwheel 136 mounted on the secondary shaft 116 and acting as intermediate gearwheel of the gear train of reverse gear, a gearwheel 152 permanently meshing with the driving gearwheel 124 mounted on the second primary shaft 114 and acting as intermediate gearwheel of the gear train of fourth gear and a gearwheel 154 acting as parking gearwheel. The above-mentioned intermediate gearwheels 150 and 152 are made as idle gearwheels, whereas the parking gearwheel 154 is made as fixed gearwheel. A sliding engagement sleeve 156 is interposed between the gearwheels 150 and 152 and is selectively movable to the left or to the right to connect the gearwheel 150 or the gearwheel 152, respectively, for rotation with the lay shaft 118, thereby engaging the reverse gear or the fourth gear, respectively.

With respect to the gearbox of FIG. 2, the forward gear corresponding to the transmission of the torque via the lay shaft 118 is therefore the fourth gear, instead of the third gear. Moreover, the gear obtained by connecting the idle gearwheel 126 for rotation with the first primary shaft by means of the sliding engagement sleeve 158 is the third gear, instead of the sixth gear. Moreover, like the gearbox of FIG. 1, also the gearbox of FIG. 3 makes it possible to carry out all the single gear shifts in powershift mode, apart from the gear shift from the first gear to the reverse gear and vice versa, since all the driving gearwheels associated to the odd gears (first, third and fifth gears) are mounted on the one primary shaft (also in this case the first primary shaft 112), whereas all the driving gearwheels associated to the even gears (second, fourth and sixth gears) are mounted on the other primary shaft (second primary shaft 114). Also the embodiment of FIG. 3 offers the same advantages described above in terms of limited axial sizes of the gearbox and of reduced actuation forces of the parking device.

As far as the electric machine, indicated 180 in FIG. 3, is concerned, the previous description relating to FIG. 1 fully applies.

Figure 4:
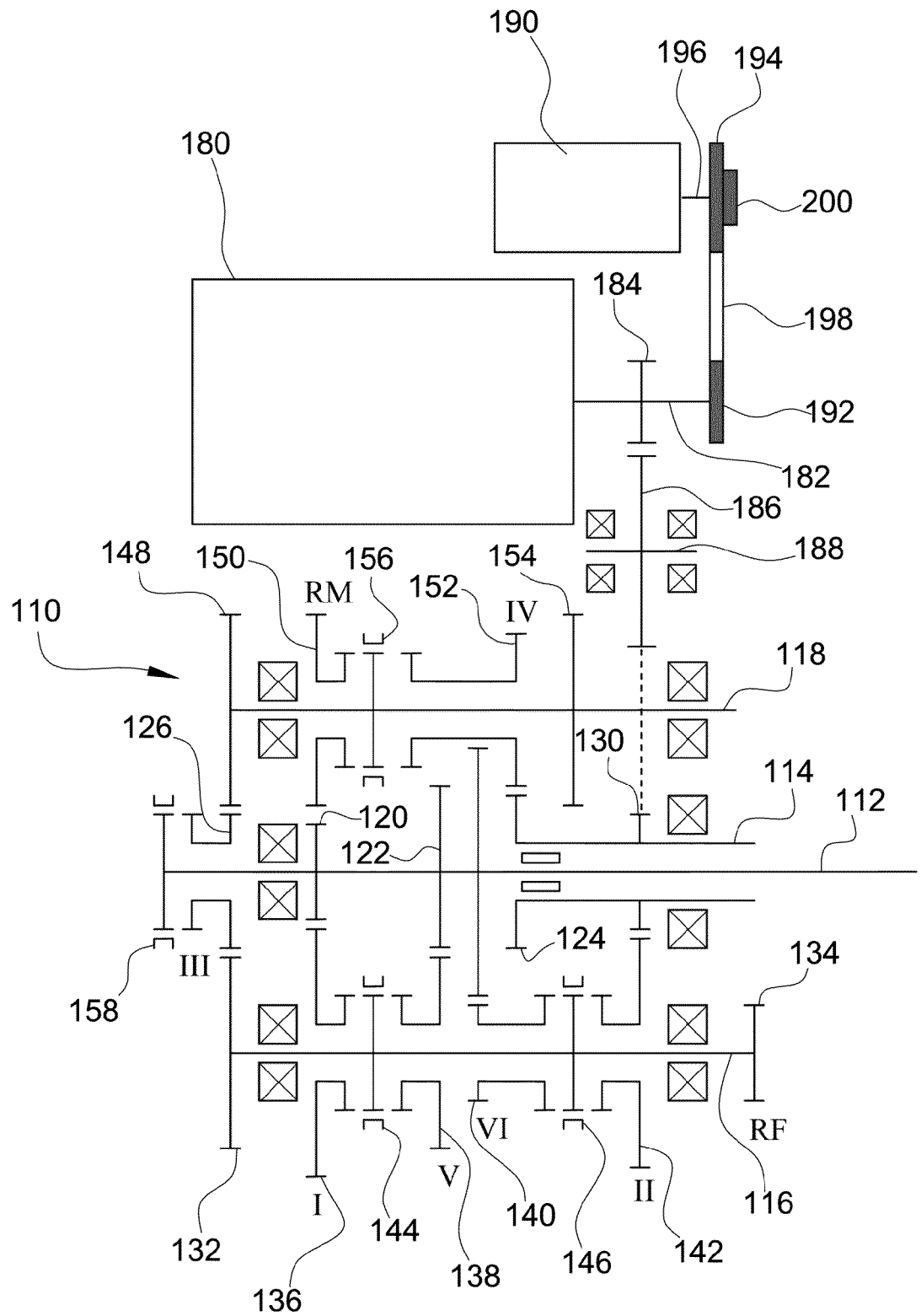
FIG. 4 is a schematic illustration of the subsystem of a hybrid propulsion system according to the present invention formed by an electric machine and by a mechanical gearbox with six forward gears and one reverse gear, wherein the gearbox differs from that of FIGS. 2 and 3 in the arrangement of the gearwheels forming the gear trains associated to the various gears.

A further embodiment of the invention is illustrated in FIG. 4, where parts and elements identical or similar to those of FIG. 3 have been given the same reference numerals.

The gearbox of FIG. 4 also comprises a pair of primary shafts 112 and 114, a secondary shaft 116 and a lay shaft 118 and has an arrangement of the gearwheels associated to the six forward gears and to the reverse gear which is identical to that of the gearbox of FIG. 3, the only difference being that the driving gearwheel 128 permanently meshing with the driven gearwheel 140 mounted on the secondary shaft 116 to implement the sixth gear is in this case mounted on the first primary shaft 112, instead of the second primary shaft 114, and specifically on the right (according to the point of view of the observer of FIG. 4) of the driving gearwheel 122. Accordingly, the gearbox of FIG. 4 does not allow to shift from the fifth gear to the sixth gear and vice versa in powershift mode, but allows anyway to shift from the sixth gear to the fourth or second gear in powershift mode in case of a kick-down manoeuvre.

As far as the electric machine, indicated 180 in FIG. 4 as well, is concerned, the previous description relating to FIG. 1 fully applies.

Figure 5:
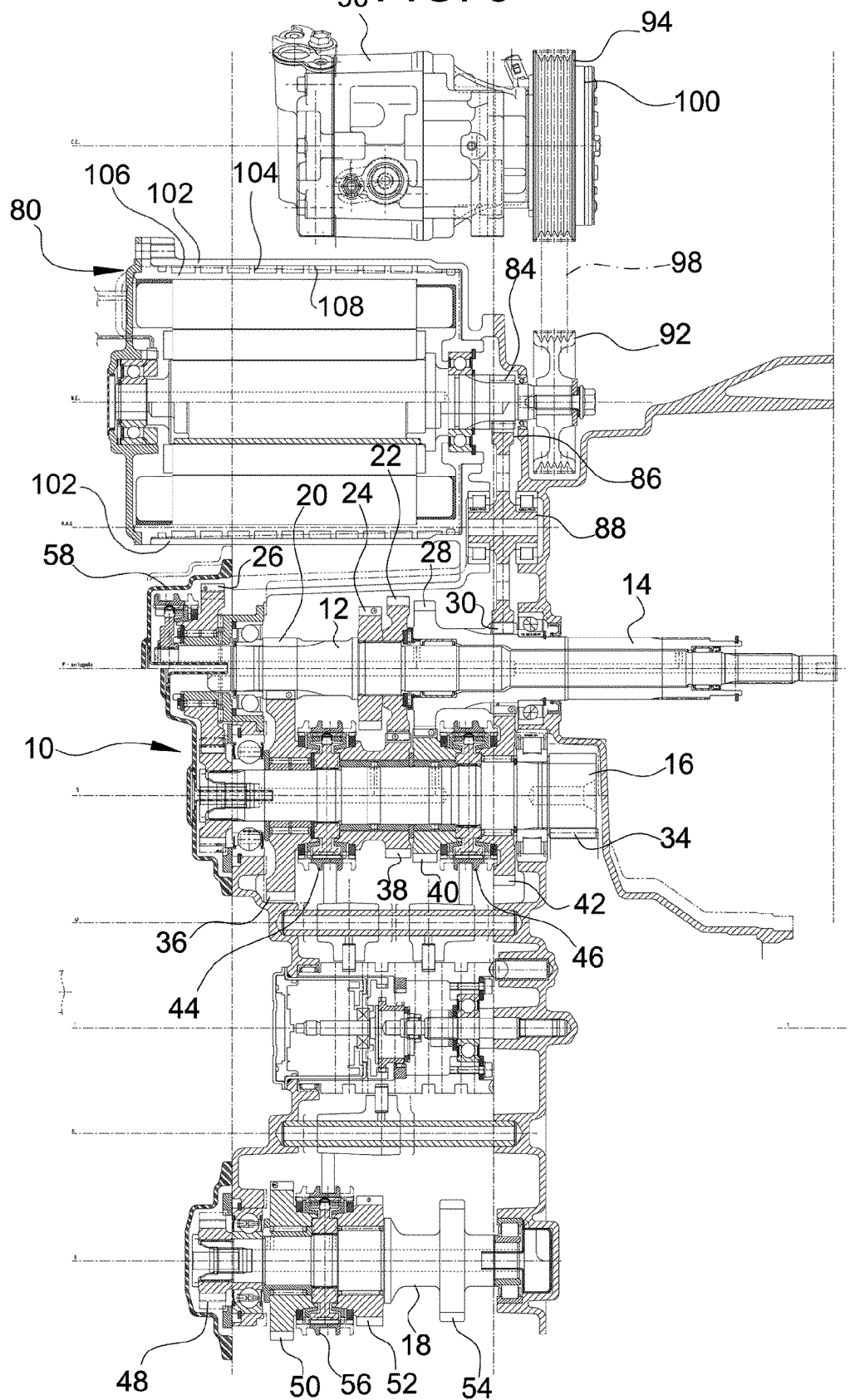
FIG. 5 is a section view of a subsystem formed by an electric machine and a gearbox according to the present invention.

According to the invention, the electric machine of the hybrid propulsion system as described above with reference to any of FIGS. 1 to 4 is integrated in the gearbox. More specifically, with reference to FIG. 5, where parts and elements identical or similar to those of FIG. 2 have been given the same reference numerals, the electric machine 80 is inserted and fixed into a seat 102 formed by a casing of the gearbox, in such a manner that a spiral-shaped profile 104 which is formed on the outer surface of a stator 106 of the electric machine and serves as cooling circuit for the electric machine is closed on the radially outer side by an inner cylindrical surface 108 of the seat 102, the channels of the cooling circuit being therefore defined between the spiral-shaped profile 104 and the inner cylindrical surface 108. By virtue of the use of the inner cylindrical surface of the seat formed by the casing of the gearbox to define, along with spiral grooves provided on the outer surface of the stator, the cooling channels for the electric machine, no additional elements are required to enclose these channels on the outer side, which reduces the overall cost of the hybrid propulsion system. The mounting of the electric machine in the casing of the gearbox described above with reference to FIG. 5 can obviously be applied to any other hybrid propulsion system having a gearbox with a different arrangement of the gears.

Naturally, the principle of the invention remaining unchanged, the embodiments and manufacturing details may be widely varied with respect to those described and illustrated purely by way of non-limiting example.

What is claimed is:

1. A hybrid propulsion system for a motor vehicle, comprising:
   an internal combustion engine, an electric machine and a double-clutch transmission, the double-clutch transmission comprising a clutch unit and a mechanical gearbox having a plurality of forward gears;
   the gearbox comprising first and second primary shafts arranged coaxially with each other and configured for being torsionally connected each to a shaft of the internal combustion engine of the motor vehicle by a respective friction clutch of the clutch unit, a secondary shaft and a lay shaft arranged parallel to the two primary shafts, and an intermediate shaft;
   wherein the electric machine is permanently kinematically connected to the first primary shaft via a first gear train including a pinion mounted on an output shaft of the electric machine, at least one intermediate gearwheel carried by the intermediate shaft, and a gearwheel mounted on the first primary shaft and acting as driving gearwheel of a second gear train of the gearbox associated to one of the forward gears;
   the gearbox comprising a casing forming a seat having an inner cylindrical surface and in which the electric machine is accommodated and fixed, and
   wherein an outer surface of a stator of the electric machine forms a spiral-shaped profile which serves as cooling circuit for the electric machine and is closed on the radially outer side by the inner cylindrical surface of the seat, in such a manner that the channels of the cooling circuit are defined between said spiral-shaped profile and said inner cylindrical surface.

2. Propulsion system according to claim 1, wherein the second gear train of the gearbox is associated to a second gear of said plurality of forward gears.

3. Propulsion system according to claim 1, wherein said first and second primary shafts are an outer primary shaft and an inner primary shaft, respectively.

4. Propulsion system according to claim 1, wherein the gearwheel acting as driving gearwheel of the second gear train is permanently connected for rotation with the respective primary shaft.

5. Propulsion system according to claim 1, wherein the intermediate shaft is supported by the casing of the gearbox.

* * * * *